United States Patent
Shraga et al.

(10) Patent No.: US 7,099,460 B1
(45) Date of Patent: Aug. 29, 2006

(54) ECHO SUPPRESSION AND ECHO CANCELLATION

(75) Inventors: Boaz Or Shraga, Ramat-Gan (IL); Mark Shahaf, Ashdod (IL); Izak Avayu, Mevaseret Zion (IL); Yishay Ben-Shimol, Ashdod (IL)

(73) Assignee: Motorola, Inc., Schaumburg, IL (US)

( * ) Notice: Subject to any disclaimer, the term of this patent is extended or adjusted under 35 U.S.C. 154(b) by 1146 days.

(21) Appl. No.: 09/670,870

(22) Filed: Sep. 27, 2000

(30) Foreign Application Priority Data

Nov. 11, 1999 (GB) ................................. 9926731.2

(51) Int. Cl.
*H04B 3/23* (2006.01)

(52) U.S. Cl. .............................. 379/406.08; 379/406.05

(58) Field of Classification Search ............................... 379/406.01–406.16
See application file for complete search history.

(56) References Cited

U.S. PATENT DOCUMENTS

| 4,645,883 A | * | 2/1987 | Horna et al. | 379/406.08 |
| 5,546,459 A | | 8/1996 | Sih et al. | |
| 5,608,804 A | * | 3/1997 | Hirano | 379/406.08 |
| 5,638,439 A | | 6/1997 | Kawada et al. | |
| 6,108,413 A | * | 8/2000 | Capman et al. | 379/406.13 |

FOREIGN PATENT DOCUMENTS

EP 000854626 A1 * 7/1998

OTHER PUBLICATIONS

Breining, C., Control of a Hands-Free Telephone Set, Received Aug. 26, 1996; Revised Feb. 17, 1997 and Mar. 29, 1997, 13 pages (pp. 131-143), Signal Processing, European Journal Devoted to the Methods and Applications of Signal Processing, NL. Elsevier Science Publishers, B.V. Amsterdam, vol. 61, No. 2.

Benesty, J. et al., Multi-Channel Adaptive Filtering Applied to Multi-Channel Acoustic Echo Cancellation, 4 pages (pp. 1405-1408, vol. 2, 1996, Signal Processing: Theories and Applications, Proceedings of Eusipco, XX, XX.

* cited by examiner

*Primary Examiner*—Daniel Swerdlow
(74) *Attorney, Agent, or Firm*—Val Jean Hillman; Valerie M. Davis

(57) ABSTRACT

Echo canceling method including the steps of determining an Euclidean norm of an echo-replica signal, determining an Euclidean norm of an input signal, determining a gradient step size, correcting the coefficients of an adaptive filter, deriving an updated echo-replica signal, and determining an updated error signal by subtracting the updated echo-replica signal from the input signal.

23 Claims, 3 Drawing Sheets

ECHO SUPPRESSION AND ECHO CANCELLATION

FIELD OF THE INVENTION

The present invention relates to methods and systems for processing sound signals in general, and to methods and systems for processing audio signals in the presence of echo conditions, in particular.

BACKGROUND OF THE INVENTION

Echo cancellation and suppression systems and methods therefor are known in the art. A speech transmission oriented system, such as a speech communication system, includes a sound production unit such as a speaker and a sound detection unit such as a microphone. The speaker produces sounds received from a remote source and the microphone detects voice sounds which are provided by the user. It is noted that the microphone also detects sounds from other sources such as noise and sounds, which are produced by the speaker (echo), after traveling through and acoustic path therebetween.

Methods and systems for "emphasizing" the voice portion over the noise and echo are known in the art. The common approaches use adaptive filtering to derive a replica of an echo-signal, which is further subtracted from the microphone signal. As a result, a level of the echo-signal is decreased significantly. Speech communication systems, especially hand-held devices, are limited in their processing and storage resources. This fact forces developers to search for new approaches for robust and high quality echo cancellation and echo suppression methods, which can function within these limited conditions.

In the article by A. Hirano et al. "A noise-robust stochastic gradient algorithm with an adaptive step-size suitable for mobile hands-free telephones", Proc. ICASST-95, v.5, pp. 1392–1395, 1995, an adaptive step-size algorithm is proposed. The algorithm controls the step size of the standard NLMS method, based on the reference input signal power and the noise power.

U.S. Pat. No. 5,608,804 to Hirano, entitled "Method of and apparatus for identifying a system with adaptive filter" is directed to a method of and an apparatus for estimating characteristics of an unknown system, using an adaptive filter, in an echo canceller. A gradient step size, which is controlled dynamically, is a function of the power of the reference input signal. The gradient step size monotonously increases if the power of the reference input signal is smaller than a threshold and monotonously decreases if the power of the reference input signal is greater than the threshold.

U.S. Pat. No. 5,546,459 to Sih, et al., entitled "Variable block size adaptation algorithm for noise-robust acoustic echo cancellation" is directed to an apparatus for acoustic echo cancellation using an adaptive filter. The apparatus updates coefficients of the adaptive filter using a signal block of length L. The block size is adjusted in response to the instantaneous signal-to-noise ratio.

SUMMARY OF THE PRESENT INVENTION

It is an object of the present invention to provide a novel method and system for echo suppression, which alleviates the disadvantages of the prior art.

It is another object of the present invention to provide a novel method and system for echo canceling, which alleviates the disadvantages of the prior art.

In accordance with the present invention, there is thus provided an echo canceling apparatus, including a signal processor, an adaptation control unit, connected to the signal processor, an adaptive filter, connected to the signal processor and to the adaptation control unit, and a subtractor, connected to the signal processor, to the adaptation control unit and to the adaptive filter.

The signal processor determines an Euclidean norm of an echo-replica signal. The signal processor also determines an Euclidean norm of an input signal. The echo replica signal can be produced by processing a reference far-end signal with the adaptive filter. The adaptation control unit corrects the coefficients of the adaptive filter. The adaptive filter derives an updated echo-replica signal. The subtractor subtracts the updated echo-replica signal from the input signal and derives an updated error signal thereof.

The echo canceling apparatus can further include a digital-to-analog converter, connected to the signal processor, to the subtractor and to a source of the input signal such as a microphone. The analog-to-digital converter converts an analog input signal into a digital input signal.

In accordance with another aspect of the present invention, there is thus provided a echo canceling method, including the steps of; determining an Euclidean norm of an echo-replica signal, determining an Euclidean norm of an input signal, determining a gradient step size, correcting the coefficients of an adaptive filter, deriving an updated echo-replica signal, and determining an updated error signal by subtracting the updated echo-replica signal from the input signal. The echo replica signal can be produced by processing a reference far-end signal with an adaptive filter.

The input signal can include at least one of the list consisting of an echo-signal, a near-end speech signal, a noise signal and the like. The gradient step size can be a function of the Euclidean norms of the echo-replica and the input signals. According to one aspect of the invention, the value of the function decreases when the values of the near-end speech and noise signals increase, and the value of the function increases when the values of the near-end speech and noise signals decrease.

The correction of the coefficients of the adaptive filter can be performed by employing the gradient step size, the reference far-end signal and an error signal. According to a preferred embodiment of the present invention, the error signal can be determined at the previous adaptation step.

In accordance with a further aspect of the present invention, there is thus provided an echo suppression apparatus including a first amplitude estimation unit, a second amplitude estimation unit, a comparison unit, connected to the first amplitude estimation unit and to the second amplitude estimation unit, and a decision logic unit connected to the comparison unit.

The first amplitude estimation unit estimates an amplitude measure of a reference far-end signal. The second amplitude estimation unit estimates an amplitude measure of an error signal. The comparison unit compares between the values of the amplitude measure of the far-end signal and the amplitude measure of the error signal and produces a comparison result thereof.

The decision logic unit analyzes the comparison result and produces a control signal thereof. The error signal can be an output of an echo cancellation system, which is connected to the echo suppression apparatus. The far-end signal and the error signal are generally digital signal blocks, each containing at least one digital sample.

In accordance with yet a further aspect of the present invention, there is thus provided an echo suppression method, including the steps of; estimating an amplitude measure of a reference far-end signal, estimating an amplitude measure of an error signal, comparing between the values of the amplitude measures of the far-end and the error signals, thereby producing a comparison value, and analyzing the comparison value, thereby producing a control signal. The error signal can be received from an echo cancellation system.

The far-end signal and the error signal, are generally digital signal blocks, where each of the digital signal blocks contains at least one digital sample.

In accordance with another aspect of the present invention, there is thus provided an echo suppression apparatus, including a first amplitude estimation unit, a second amplitude estimation unit, a comparison unit, connected to the first amplitude estimation unit and to the second amplitude estimation unit, a delay unit, connected to the comparison unit, and a decision logic unit connected to the delay unit.

The first amplitude estimation unit produces at least two far-end signal amplitude measure values by estimating an amplitude measure of a reference far-end signal. The reference far-end signal is a sequence of at least two digital signal blocks, where each of the digital signal blocks contains at least one digital sample. The second amplitude estimation unit produces at least two error signal amplitude measure values by estimating an amplitude measure of an error signal. The error signal is a sequence of at least two digital signal blocks, where each of the digital signal blocks contains at least one digital sample.

The comparison unit determines a plurality of value pairs. Each of the pairs includes a selected one of the error signal amplitude measure values and a respective one of the far-end signal amplitude measure values. The comparison unit further compares between the far-end signal amplitude measure value and the error signal measure value, within each of the value pairs and produces at least two comparison results thereof.

The delay unit stores the comparison results. The decision logic unit analyzes the comparison results and produces a control signal thereof.

In accordance with yet another aspect of the present invention, there is provided an echo suppression method including the steps of:

ξProducing at least two far-end signal amplitude measure values by estimating an amplitude measure of a reference far-end signal. The reference far-end signal is a sequence of at least two digital signal blocks. Each of the digital signal blocks contains at least one digital sample.

ξProducing at least two error signal amplitude measure values by estimating an amplitude measure of an error signal. The error signal includes a sequence of at least two digital signal blocks. Each of the digital signal blocks contains at least one digital sample.

ξDetermining a plurality of value pairs, where each pair includes a selected one of the error signal amplitude measure values and a respective one of the far-end signal amplitude measure values.

ξComparing between the far-end signal amplitude measure value and the error signal amplitude measure value, within each of the value pairs, thereby producing at least two comparison results.

ξAnalyzing the at least two comparison results, thereby producing a control signal.

In accordance with another aspect of the present invention, there is thus provided an echo suppression apparatus which includes a first amplitude estimation unit, a second amplitude estimation unit, a comparison unit, connected to the first amplitude estimation unit and to the second amplitude estimation unit, and a decision logic unit, connected to the comparison unit.

The first amplitude estimation unit estimates an amplitude measure of a reference far-end signal. The second amplitude estimation unit estimates an amplitude measure of an error signal. The comparison unit compares between the values of the amplitude measure of the far-end signal and the amplitude measure of the error signal and produces a comparison result thereof.

The decision logic unit analyzes the comparison result and produces a control signal thereof. The error signal can be the output of an echo cancellation system, which is connected to the echo suppression apparatus of the invention.

In accordance with a further aspect of the invention, there is provided an echo suppression apparatus, including a first amplitude estimation unit, a second amplitude estimation unit, a comparison unit, connected to the first amplitude estimation unit and to the second amplitude estimation unit, a delay unit, connected to the comparison unit, and a decision logic unit connected to the delay unit. The first amplitude estimation unit produces at least two far-end signal amplitude measure values by estimating an amplitude measure of a reference far-end signal, wherein the reference far-end signal is a sequence of at least two digital signal blocks. Each of the digital signal blocks contains at least one digital sample.

The second amplitude estimation unit produces at least two error signal amplitude measure values by estimating an amplitude measure of an error signal, wherein the error signal is a sequence of at least two digital signal blocks. Each of the digital signal blocks contains at least one digital sample.

The comparison unit determines a plurality of value pairs. Each of the pairs includes a selected one of the error signal amplitude measure values and a respective one of the far-end signal amplitude measure values. The comparison unit compares between the far-end signal amplitude measure value and the error signal measure value, within each of the value pairs and produces at least two comparison results thereof. The delay unit stores the at least two comparison results. The decision logic unit analyzes the comparison results and produces a control signal thereof.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The present invention alleviates the disadvantages of the prior art by providing better robustness of echo cancellation, whenever an additive background noise and/or near-end speech are present. It also provides a more accurate and computation-effective method of echo suppression.

Figure 1:
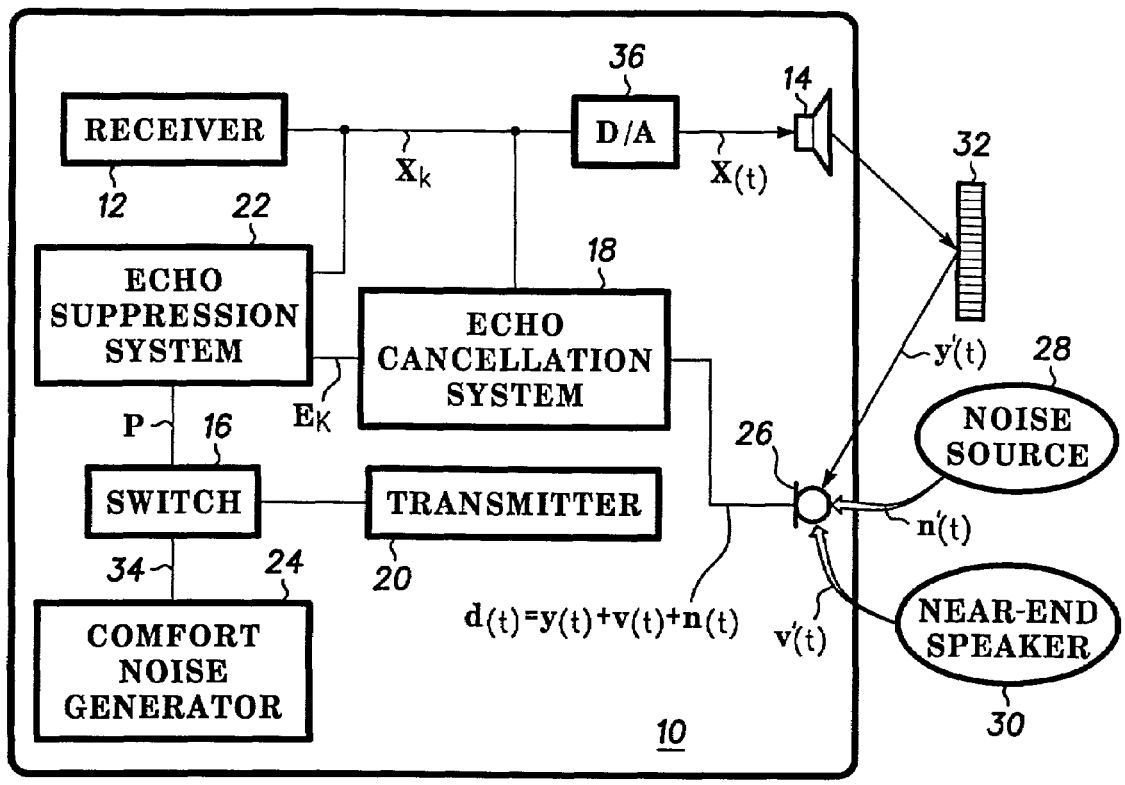
FIG. 1 is a schematic illustration of a speech communication system, constructed and operative in accordance with a preferred embodiment of the present invention.

Reference is now made to FIG. 1, which is a schematic illustration of a speech communication system, generally referenced 10, constructed and operative in accordance with a preferred embodiment of the present invention.

Speech communication system 10 includes a receiver 12, a loudspeaker 14, a switch 16, an echo-cancellation system 18, a transmitter 20, an echo-suppression system 22, a comfort noise generator 24, a digital-to-analog converter (D/A) 36 and a microphone 26.

Echo-cancellation system 18 is connected to receiver 12, to digital-to-analog converter 36, to echo-suppression system 22, and to microphone 26. Echo-suppression system 22 is connected to D/A 36, and to switch 16. Transmitter 20 and comfort noise generator 24 are connected to switch 16. Loudspeaker 14 is connected to D/A 36.

Receiver 12 receives an RF signal, extracts the audio information embedded therein and produces a digital audio stream $X_k$. Receiver 12 further provides the digital audio stream $X_k$ to D/A 36, to echo-suppression system 22 and to echo-cancellation system 18. D/A 36 converts the digital audio stream $X_k$ into an analog signal x(t) and provides it to loudspeaker 14. Loudspeaker 14 converts further the signal x(t) into an analog sound signal and provides it to a near-end speaker 30. Microphone 26 detects an echo-signal y'(t), which is a combination of the sound, radiated by loudspeaker 14 and a sound, reflected from a reflector 32. Microphone 26 detects also a speech signal v'(t) from the near-end speaker 30 and a noise signal n'(t) from a noise source 28. Microphone 26 converts acoustic signals y'(t), v'(t), and n'(t) into electric signals y(t), v(t) and n(t), respectively. Microphone 26 provides a signal d(t), which is a combination of the signals y(t), v(t) and n(t) to echo-cancellation system 18.

Echo-cancellation system 18 analyzes the signals $X_k$ and d(t), estimates an echo replica and performs echo cancellation. The echo replica estimation is performed by employing a novel adaptive filtering method, which will be described in detail hereinafter. Echo-cancellation system 18 provides an output digital signal $E_k$ to echo-suppression system 22.

Echo-suppression system 22 analyzes the signals from the loudspeaker 14 and echo-cancellation system 18. Based on predetermined conditions, echo-suppression system 22 replaces, if necessary, the output signal $E_k$ with an artificial noise signal 34, generated by comfort noise generator 24. Echo-suppression system 22 controls switch 16, which performs the switching between the output signal $E_k$ and the artificial noise signal. Switch 16 provides the output signal to transmitter 20.

Figure 2:
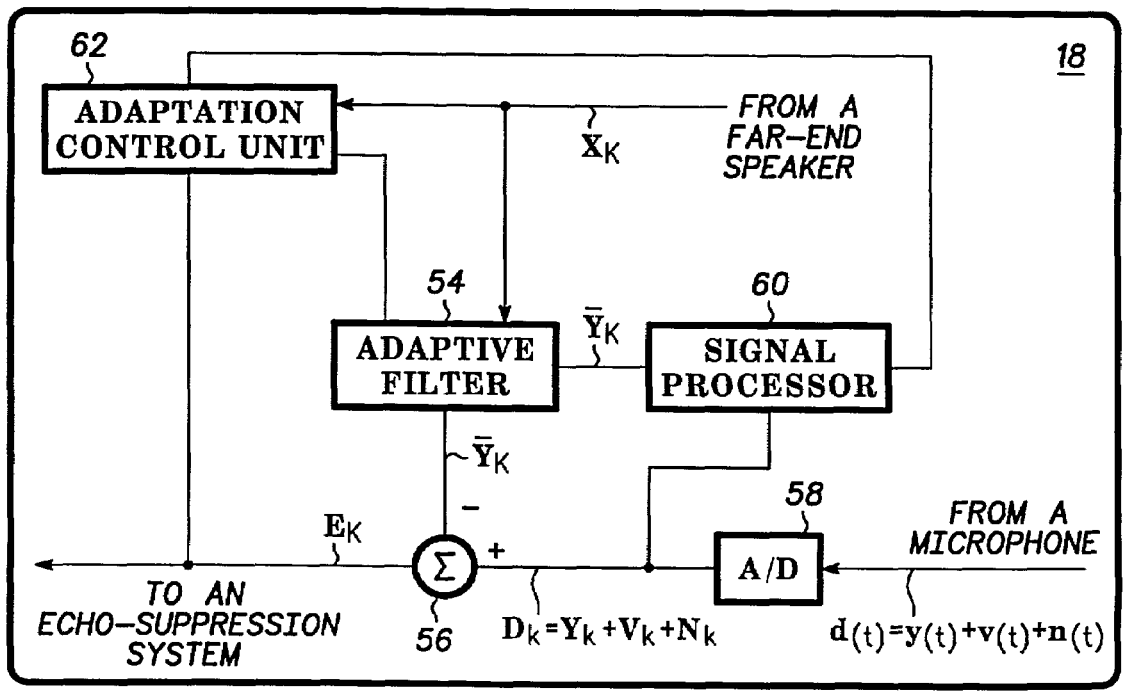
FIG. 2 is a schematic illustration in detail of the echo-cancellation system of FIG. 1, constructed and operative in accordance with a further preferred embodiment of the present invention.

Reference is now made to FIG. 2, which is a schematic illustration in detail of echo-cancellation system 18 (FIG. 1), constructed and operative in accordance with a further preferred embodiment of the present invention.

Echo-cancellation system 18 includes analog-to-digital converter (A/D) 58, an adaptive filter 54, an adaptation control unit 62, a signal processor 60, and a summator 56. Adaptive filter 54 is connected to the first input of summator 56, to signal processor 60, and to adaptation control unit 62. A/D converter 58 is connected to the second input of summator 56, and to signal processor 60. Adaptation control unit 62 is further connected to the output of summator 56, and to signal processor 60.

A/D converter 58 converts an analog signal d(t) into a digital signal $D_k$. System 18 operates on digital signal blocks of length L, hence the signal $D_k$ is a vector of length L, with components $D_k(0)$, $D_k(1)$ . . . $D_k(L-1)$. Index k denotes a block number and has values 0, 1, 2, . . . . The signal d(t) is a sum of signals y(t), v(t) and n(t). Hence, signal $D_k$ will be a sum of respective digital signals $Y_k$, $V_k$ and $N_k$, each of them being a vector of length L. Accordingly, the signal $X_k$ is a vector of length L, with components $X_k(0)$, $X_k(1)$ . . . $X_k(L-1)$.

Signal processor 60 receives near-end signal $D_k$ and echo-replica signal $\hat{Y}_k$, determines Euclidean norms of the signals $D_k$ and $\hat{Y}_k$, and provides it to adaptation control unit 62. It is noted that the filter tap values, which are used for echo-replica signal $\hat{Y}_k$ calculation, were determined during the previous iteration.

Adaptation control unit 62 receives far-end signal $X_k$, error (residual) signal $E_k = D_k - \hat{Y}_k$ and the Euclidean norms of the signals $D_k$ and $\hat{Y}_k$, and outputs filter tap correction values thereof. Adaptation control unit 62 provides further corrected filter tap values to adaptive filter 54.

Adaptive filter 54 receives the far-end signal $X_k$ and the corrected filter tap values, and outputs echo-replica signal $\hat{Y}_k$. Adaptive filter 54 provides echo-replica signal $\hat{Y}_k$ to summator 56.

Summator 56 sums signals $D_k$ and $\hat{Y}_k$, produces an error signal $E_k$ at the output, and provides signal $E_k$ to echo-suppression system 22, and to adaptation control unit 62.

Figure 3:
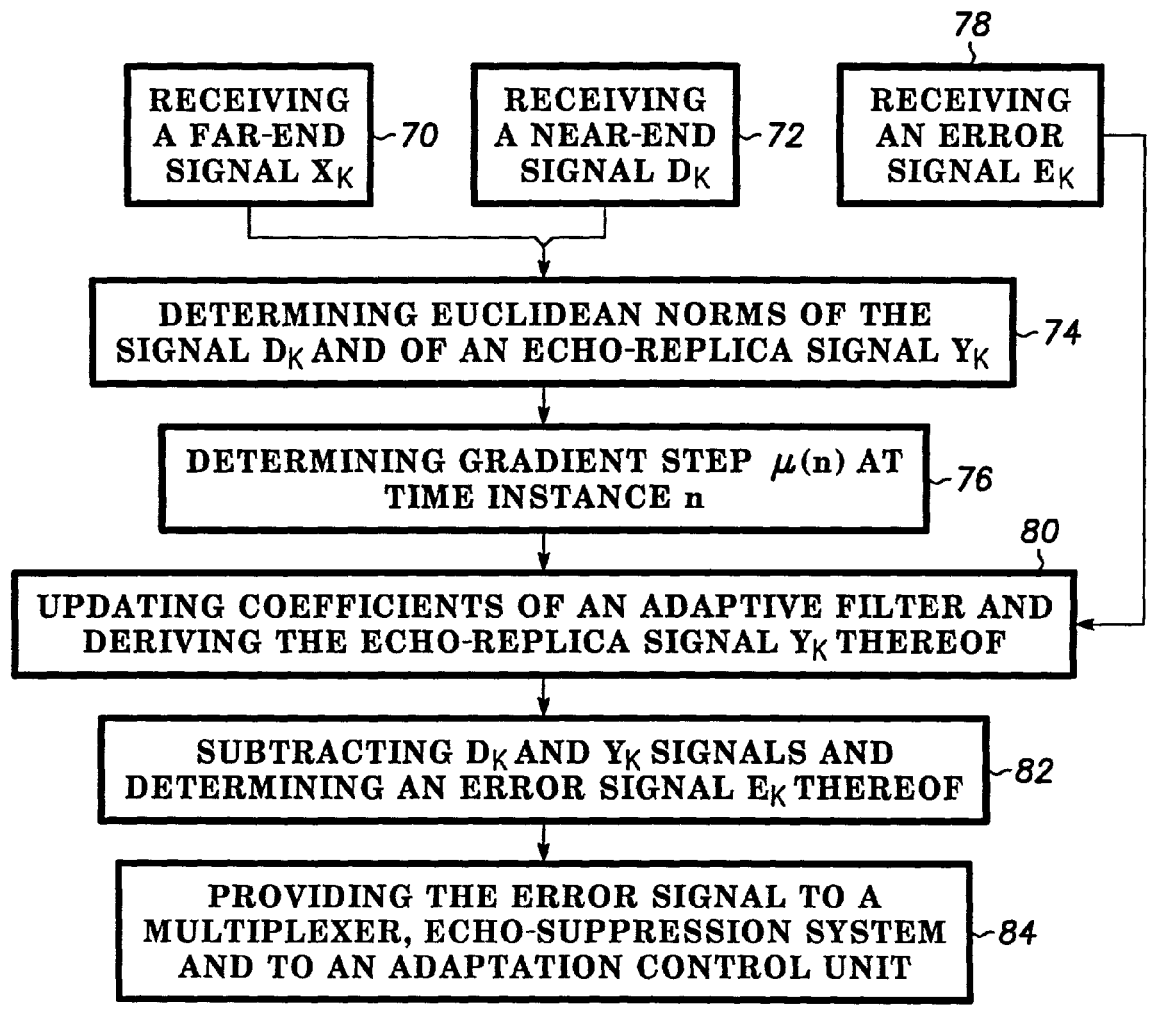
FIG. 3 is a schematic illustration of a method for operating the echo-cancellation system of FIG. 2, operative in accordance with a further preferred embodiment of the present invention.

Reference is further made to FIG. 3, which is a schematic illustration of a method for operating echo-cancellation system 18 (FIG. 2), operative in accordance with a further preferred embodiment of the present invention.

In step 70, a far-end signal $X_k$ is received by adaptation control unit 62, and adaptive filter 54. With reference to FIG. 2, a digital far-end signal $X_k$, is provided by a far-end speaker to adaptation control unit 62, and to adaptive filter 54.

In step 72, a near-end signal $D_k$ is received by summator 56, and signal processor 60. With reference to FIG. 2, A/D converter 58 converts an analog near-end signal d(t) into a digital near-end signal $D_k$, and provides it to summator 56, and to signal processor 60.

In step 74, Euclidean norms $\|D_k(n)\|$ and $\|Y_k(n)\|$ of the signals $D_k$ and $\hat{Y}_k$ respectively, at time instance n, are calculated. With reference to FIG. 2, signal processor 60 receives signals $D_k$ and $\hat{Y}_k$, and determines Euclidean norms $\|D_k(n)\|$ and $\|\hat{Y}_k(n)\|$ according to the following expressions:

$$\|D_k(n)\|^2 = \sum_{l=0}^{L-1} D_k^2(n-l), \quad \|\hat{Y}_k(n)\|^2 = \sum_{l=0}^{L-1} \hat{Y}_k^2(n-l), \qquad (1)$$

Signal processor 60 provides further the Euclidean norms $\|D_k(n)\|$ and $\|Y_k(n)\|$ to adaptation control unit 62.

In step 76, a gradient step size $\Pi(n)$, at time instance n, is determined. With reference to FIG. 2, adaptation control unit 62 receives far-end signal block $X_k$, residual signal block $E_k$, and the Euclidean norms $\|D_k(n)\|$ and $\|\hat{Y}_k(n)\|$. Gradient step size $\Pi(n)$ is further determined as:

$$\Pi(n) = \frac{\Pi_0 \|X_k(n)\|^2 \|\hat{Y}_k(n)\|^2 E}{\|X_k(n)\|^2 \|\hat{Y}_k(n)\|^2 E \|D_k(n)\|^2 \Delta \|\hat{Y}_k(n)\|^2} \quad (2)$$

where $\Delta$ and E are constants. The value of $\Delta$ depends on hardware and software implementation of the system, and can be determined experimentally. The optimal value of $\Delta$ will be the one which effects in a maximal echo cancellation. The value of E can also be determined experimentally. The constant $\Delta$ is dimensionless, and the constant E has dimensions of energy. It is noted, that constants $\Delta$ and E can be multi-valued, i.e. they can be represented with vectors, having components $\Delta(i)$, $E(j)$ $(i,j=1, 2, 3, \ldots)$. The most appropriate values of $\Delta(i)$, $E(j)$ can be selected, depending on the working conditions, and HW and SW implementation. It is appreciated, that other expressions for the gradient step size can be used, such as that proposed in the article by A. Hirano, et al. "A noise-robust stochastic gradient algorithm with an adaptive step-size suitable for mobile hands-free telephones", Proc. ICASST-95, v.5, pp. 1392–1395, 1995.

It is noted, that the value of the gradient step size $\Pi(n)$ is controlled dynamically. It follows from equation (2), that $\Pi(n)$ decreases with a rise in the near-end signal $V_k$ or the noise signal $N_k$. In other words, the adaptation process will be performed more accurately, and hence, the robustness of the system will improve. In an opposite case of low near-end and noise signals, $\Pi(n)$ will rise, causing, in turn, a rise in adaptation speed.

Based on the gradient step size $\Pi(n)$, adaptation control unit 62 further determines an updated vector $H(n+1)$, at a time $n+1$. The components $H_q(n+1)$ of the vector $H(n+1)$ represent filter tap coefficients and are determined according to the following recurrent expression:

$$H_q(n\,1) \; H_q(n) \; \Pi(n) \; E_k(n) \; X_k(n\,q), \quad (3)$$

where $q=0, 1, 2, \ldots Q-1$, and Q is the order of adaptive filter 54. It is noted that the length L of the signal block $X_k$, can be less than the order Q of adaptive filter 54. In this case, additional Q L zero valued samples must be appended to the signal block $X_k$, so that the dimension of the signal block $X_k$, will be equal to dimension of the adaptive filter 54. Adaptation control unit 62 provides the updated vector H to adaptive filter 54.

In step 80, adaptive filter tap coefficients are updated and an echo-replica signal $\hat{Y}_k$ is derived thereof. With reference to FIG. 2, adaptive filter 54 receives near-end signal block $X_k$, and vector H, and derives the echo-replica signal $\hat{Y}_k(n)$, at a time instance n, according to the following expression:

$$Y_k(n) \; \underset{q\,0}{\overset{Q\,1}{\sum}} H_k(q) \; X_k(n\,q), \quad (4)$$

The echo-replica signal $\hat{Y}_k(n)$ is further provided to signal processor 60, and to summator 56.

In step 82, signals $\hat{Y}_k(n)$ and $D_k(n)$ are subtracted and an error signal $E_k(n)$ is determined thereof. With reference to FIG. 2, summator 56 receives signals $\hat{Y}_k(n)$ and $D_k(n)$ and derives the error signal $E_k(n) \; D_k(n) \; \hat{Y}_k(n)$ at the output.

In step 84, error signal $E_k$ at time n, is provided to echo-suppression system 22 (FIG. 1), and to adaptation control unit 62. With reference to FIG. 2, summator 56 provides the error signal $E_k$ at time n, to adaptation control unit 62, for the next iteration, and to echo-suppression system 22.

Figure 4:
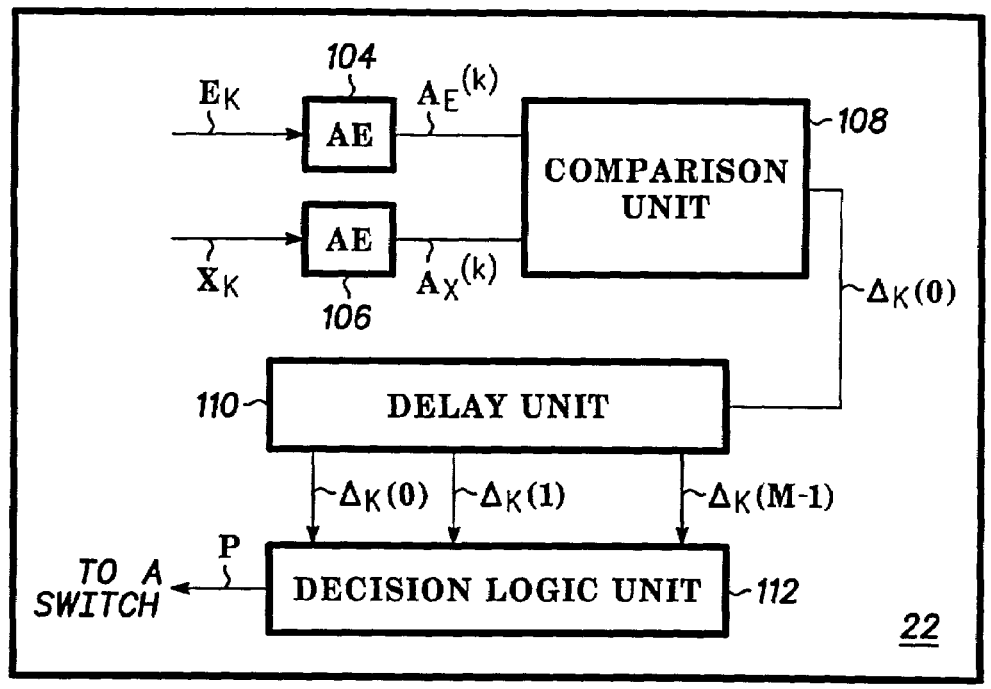
FIG. 4 is a schematic illustration in detail of the echo-suppression system of FIG. 1, constructed and operative in accordance with a further preferred embodiment of the present invention.

Reference is now made to FIG. 4, which is a schematic illustration in detail of echo-suppression system 22 (FIG. 1), constructed and operative in accordance with a further preferred embodiment of the present invention.

Echo-suppression system 22 includes amplitude estimation units 104 and 106, a comparison unit 108, a delay unit 110, and a decision logic unit 112.

Comparison unit 108 is connected to delay unit 110, and to amplitude estimation units 104 and 106. Decision logic unit 112 is connected to delay unit 110.

Amplitude estimation units 104 and 106 receive signals $E_k$ and $X_k$, respectively. Each of the amplitude estimation units further determines an amplitude estimation $A_E^{(k)}$ and $A_X^{(k)}$ of the respective signals, and provide the result to comparison unit 108.

Comparison unit 108 performs the comparison of amplitude estimations $A_E^{(k)}$ and $A_X^{(k)}$, and provides the result to delay unit 110. Delay unit 110 already contains the results of comparisons made for the previous M-1 pairs of signal blocks. The output of delay unit 110 is a vector $\ni_k$ with components $\ni_k(0)$, $\ni_k(1)$, ... $\ni_k(M-1)$. Delay unit 110 provides vector $\ni_k$ to decision logic unit 112.

Decision logic unit 112 analyzes vector $\ni_k$, and produces a control signal P. Decision logic unit 112 provides the control signal P to switch 16 (FIG. 1).

Figure 5:
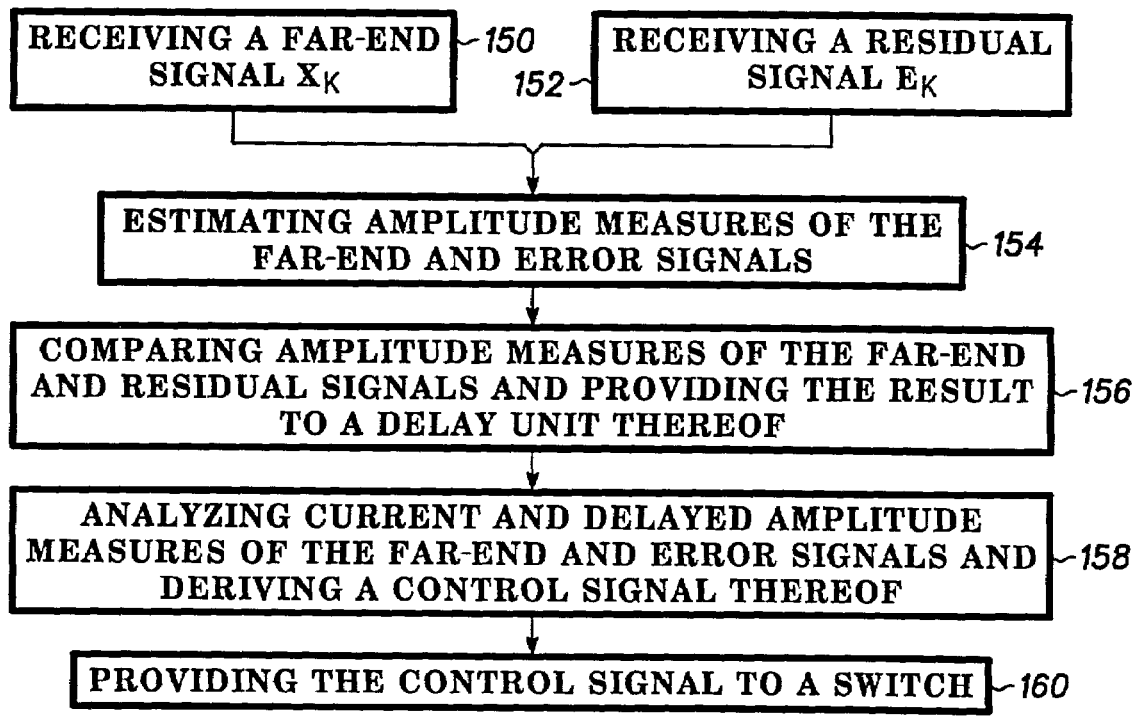
FIG. 5 is a schematic illustration of a method for operating the echo-suppression system of FIG. 4, operative in accordance with another preferred embodiment of the present invention.

Reference is further made to FIG. 5, which is a schematic illustration of a method for operating echo-suppression system 22 (FIG. 4), operative in accordance with another preferred embodiment of the present invention.

In steps 150 and 152, the far-end signal $X_k$ and error signal $E_k$ are received. With reference to FIG. 4, amplitude estimation unit 106 receives the far end signal $X_k$, and amplitude estimation unit 104 receives error signal $E_k$ from echo-cancellation system 18 (FIG. 1).

In step 154, amplitude measures of the far-end and residual signals are estimated. With reference to FIG. 4, amplitude estimation units 104 and 106 determine amplitude measures $A_E^{(k)}$ and $A_X^{(k)}$ for signals $E_k$ and $X_k$, respectively, according to the following expressions $$A_E^{(k)} \; \underset{l\,0}{\overset{L\,1}{\sum}} |E_k(l)|, \; A_X^{(k)} \; \underset{l\,0}{\overset{L\,1}{\sum}} |X_k(l)|, \quad (5)$$

where L is a length of signal blocks $E_k$ and $X_k$. Amplitude measures $A_E^{(k)}$ and $A_X^{(k)}$ are further provided to comparison unit 108.

It is appreciated that instead of amplitude measures $A_E^{(k)}$ and $A_X^{(k)}$, it is possible to use other signal measures, for example energy estimate. It is noted, that in distinction to energy estimation, which is quadratic in signal amplitude, amplitude measures $A_E^{(k)}$ and $A_X^{(k)}$ are linear functions of signal amplitudes $E_k$ and $X_k$, respectively. The use of $A_E^{(k)}$ and $A_X^{(k)}$ reduces the amount of the required calculations, and furthermore, increases their accuracy. In step 156, amplitude measures $A_E^{(k)}$ and $A_X^{(k)}$ are compared. With reference to FIG. 4, comparison unit 108 receives amplitude measures $A_E^{(k)}$ and $A_X^{(k)}$, compares them, and produces a boolean output $\ni_k(0)$, according to the following conditional expressions:

$$\overset{\uparrow}{_o}\ni_k(0) \; 1, \; \text{if} \; A_X^{(k)} \; A_E^{(k)} \,!\, T, \quad (6)$$

$$\overset{\rightarrow}{_o}\ni_k(0) \; 0, \; \text{otherwise}$$

where T is a threshold value. The value of T is determined experimentally. The value of $\ni_k(0)$ is further provided to delay unit 110. Delay unit 110 already contains the results of comparisons made for the previous M−1 pairs of signal blocks. The output of delay unit 110 is a vector $\ni_k$ with components $\ni_k(0)$, $\ni_k(1)$, . . . $\ni_k(M-1)$. Delay unit 110 provides vector $\ni_k$ to decision logic unit 112.

In step 158, the results of the current comparison, and previous M−1 comparisons of amplitude measures, are analyzed, and a respective control signal is derived thereof. With the reference to FIG. 4, decision logic unit 112 receives comparison vector $\ni_k$, analyzes comparison vector $\ni_k$, and derives appropriate control signal P for switch 16. The decision process is accomplished in accordance with the following logical scheme:

if ($\ni_k(0)$==1, $\ni_k(1)$==1, . . . $\ni_k(M-1)$==1)
count=M
endif
count=count-1
if(count>0)
 P==1
else
 P==O
endif In step 160, control signal P is provided to switch 16. With reference to FIG. 4, decision logic unit 112 provides control signal P to switch 16. In case P==1, switch 16 replaces signal $E_k$ with comfort noise, otherwise signal $E_k$ is provided to transmitter 20.

It will be appreciated by persons skilled in the art that the present invention is not limited to what has been particularly shown and described hereinabove. Rather the scope of the present invention is defined only by the claims, which follow.

The invention claimed is:

1. An echo canceling method, the method comprising the steps of:
   determining an Euclidean norm of an echo-replica signal;
   determining an Euclidean norm of an input signal;
   determining a gradient step size, wherein said gradient step size is a function of said Euclidean norms of said echo-replica and input signals;
   correcting the coefficients of an adaptive filter;
   deriving an updated echo-replica signal, and
   determining an updated error signal by subtracting said updated echo-replica signal from said input signal.

2. The method according to claim 1, wherein said echo replica signal is produced by processing a reference far-end signal with an adaptive filter.

3. The method according to claim 1, wherein said input signal includes at least one of the list consisting of:
   an echo-signal;
   a near-end speech signal, and
   a noise signal.

4. The method according to claim 1, wherein the value of said function decreases when the values of said near-end speech and noise signals increase, and wherein the value of said function increases when the values of said near-end speech and noise signals decrease.

5. The method according to claim 1, wherein the correction of said coefficients of said adaptive filter is performed by employing said gradient step size, said reference far-end signal and an error signal, said error signal determined at the previous adaptation step.

6. Echo canceling apparatus, comprising:
   a signal processor, wherein said signal processor determines an Euclidean norm of an echo-replica signal and determines an Euclidean norm of an echo-replica signal;
   an adaptation control unit, connected to said signal processor;
   an adaptive filter, connected to said signal processor and to said adaptation control unit, and
   a subtractor, connected to said signal processor, to said adaptation control unit and to said adaptive filter.

7. The echo canceling apparatus, according to claim 6, wherein said echo replica signal is produced by processing a reference far-end signal with said adaptive filter.

8. The echo canceling apparatus, according to claim 6, wherein said input signal includes at least one of the list consisting of:
   an echo-signal;
   a near-end speech signal, and
   a noise signal.

9. The echo canceling apparatus, according to claim 6, wherein said adaptation control unit determines a gradient step size.

10. The echo canceling apparatus, according to claim 9, wherein said gradient step size is a function of said Euclidean norms of said echo-replica and input signals.

11. The echo canceling apparatus, according to claim 10, wherein the value of said function decreases when the values of said near-end speech and noise signals increase and wherein the value of said function increases when the value of said near-end speech and noise signals decrease.

12. The echo canceling apparatus, according to claim 6, wherein said adaptation control unit corrects the coefficients of said adaptive filter.

13. The echo canceling apparatus, according to claim 12, wherein said correction of said coefficients of said adaptive filter is performed by employing said gradient step size, said reference far-end signal and an error signal, said error signal determined at the previous adaptation step.

14. The echo canceling apparatus, according to claim 6, wherein said adaptive filter derives an updated echo-replica signal.

15. The echo canceling apparatus, according to claim 14, wherein said subtractor subtracts said updated echo-replica signal from said input signal and derives an updated error signal thereof.

16. The echo canceling apparatus, according to claim 6, further comprising a an analog-to-digital converter, connected to said signal processor, to said subtractor and to a source of said input signal.

17. The echo canceling apparatus, according to claim 16, wherein said analog-to-digital converter converts an analog input signal into a digital input signal.

18. An echo suppression method comprising the steps of:
   producing at least two far-end signal amplitude measure values by estimating an amplitude measure of a reference far-end signal, wherein said reference far-end signal is a sequence of at least two digital signal blocks, each said digital signal blocks contains at least one digital sample;

producing at least two error signal amplitude measure values by estimating an amplitude measure of an error signal, wherein said error signal comprises a sequence of at least two digital signal blocks, each said digital signal block contains at least one digital sample;

determining a plurality of value pairs, each said pair including a selected one of said at least two error signal amplitude measure values and a respective one of said at least two far-end signal amplitude measure values;

comparing between said far-end signal amplitude measure value and said error signal amplitude measure value, within each said value pairs, thereby producing at least two comparison results;

analyzing said at least two comparison results, thereby producing a control signal.

19. Echo suppression apparatus, comprising:

a first amplitude estimation unit;

a second amplitude estimation unit, wherein said first amplitude estimation unit produces at least two far-end signal amplitude measure values by estimating an amplitude measure of a reference far-end signal, wherein said reference far-end signal is a sequence of at least two digital signal blocks, each said digital signal block contains at least one digital sample;

a comparison unit, connected to said first amplitude estimation unit and to said second amplitude estimation unit;

a delay unit, connected to said comparison unit; and a decision logic unit, connected to said delay unit.

20. The apparatus for echo suppression, according claim 19, wherein said second amplitude estimation unit produces at least two error signal amplitude measure values by estimating an amplitude measure of an error signal, wherein said error signal is a sequence of at least two digital signal blocks, each said digital signal block contains at least one digital sample.

21. The apparatus for echo suppression, according to claim 20, wherein said comparison unit determines a plurality of value pairs, each said pair including a selected one of said at least two error signal amplitude measure values and a respective one of said at least two far-end signal amplitude measure values, compares between said far-end signal amplitude measure value and said error signal measure value, within each said value pairs and produces at least two comparison results thereof.

22. The apparatus for echo suppression, according to claim 21, wherein said delay unit stores said at least two comparison results.

23. The apparatus for echo suppression, according to claim 22, wherein said decision logic unit analyzes said at least two comparison results and produces a control signal thereof.

* * * * *

UNITED STATES PATENT AND TRADEMARK OFFICE
CERTIFICATE OF CORRECTION

PATENT NO. : 7,099,460 B1  
APPLICATION NO. : 09/670870  
DATED : August 29, 2006  
INVENTOR(S) : Or-Shraga et al.

Page 1 of 1

It is certified that error appears in the above-identified patent and that said Letters Patent is hereby corrected as shown below:

On title page (75) change inventor name from "SHRAGA" to --OR-SHRAGA--

Claim 16, column 10, line 55, delete "a"

Claim 20, column 12, line 3, add --to-- after "according"

Signed and Sealed this

Seventeenth Day of April, 2007

JON W. DUDAS  
*Director of the United States Patent and Trademark Office*